United States Patent [19]
Nair

[11] Patent Number: 5,929,333
[45] Date of Patent: *Jul. 27, 1999

[54] FLOW RATE AND DIRECTION MEASUREMENT SYSTEM

[75] Inventor: Rajesh M. Nair, Nashua, N.H.

[73] Assignee: Cambridge AccuSense, Inc., Shirley, Mass.

[ * ] Notice: This patent is subject to a terminal disclaimer.

[21] Appl. No.: 08/892,529

[22] Filed: Jul. 14, 1997

Related U.S. Application Data

[63] Continuation-in-part of application No. 08/572,895, Dec. 18, 1995, Pat. No. 5,792,951, which is a continuation-in-part of application No. 08/182,654, Jan. 18, 1994, Pat. No. 5,511,415.

[51] Int. Cl.⁶ .................................................. G01F 1/68
[52] U.S. Cl. ........................................ 73/204.11; 374/140
[58] Field of Search ........................... 73/170.01, 170.08, 73/170.12, 170.11, 1.16, 1.29, 204.11, 204.19, 204.22, 861.65, 861.66; 374/142, 40, 41

[56] References Cited

U.S. PATENT DOCUMENTS

| | | | |
|---|---|---|---|
| 3,435,676 | 4/1969 | Bruckner et al. | 73/170.12 |
| 3,438,253 | 4/1969 | Kuether et al. | 73/170.12 |
| 4,856,330 | 8/1989 | Honda et al. | 73/170.12 |
| 5,359,878 | 11/1994 | Mudd | 73/1.16 |
| 5,412,983 | 5/1995 | Rombach et al. | 73/170.12 |
| 5,461,910 | 10/1995 | Hodson et al. | 73/170.12 |
| 5,520,047 | 5/1996 | Takahashi et al. | 73/170.12 |
| 5,576,487 | 11/1996 | Gimson | 73/1.16 |

*Primary Examiner*—Harshad Patel
*Attorney, Agent, or Firm*—Iandiorio & Teska

[57] ABSTRACT

A flow rate measurement and direction system including a number of self calibrating probes each having a sensor with two thermistors for providing signals related to the flow rate; and a connector for interfacing the sensor with a monitor, the connector including a memory for storing calibration data unique to each of the thermistors. The monitor includes a microprocessor for polling the memory and for extracting the calibration data, for converting the signals provided by the thermistors into calibrated signals by applying the extracted calibration data to the signals, and a routine for determining the flow direction.

14 Claims, 5 Drawing Sheets

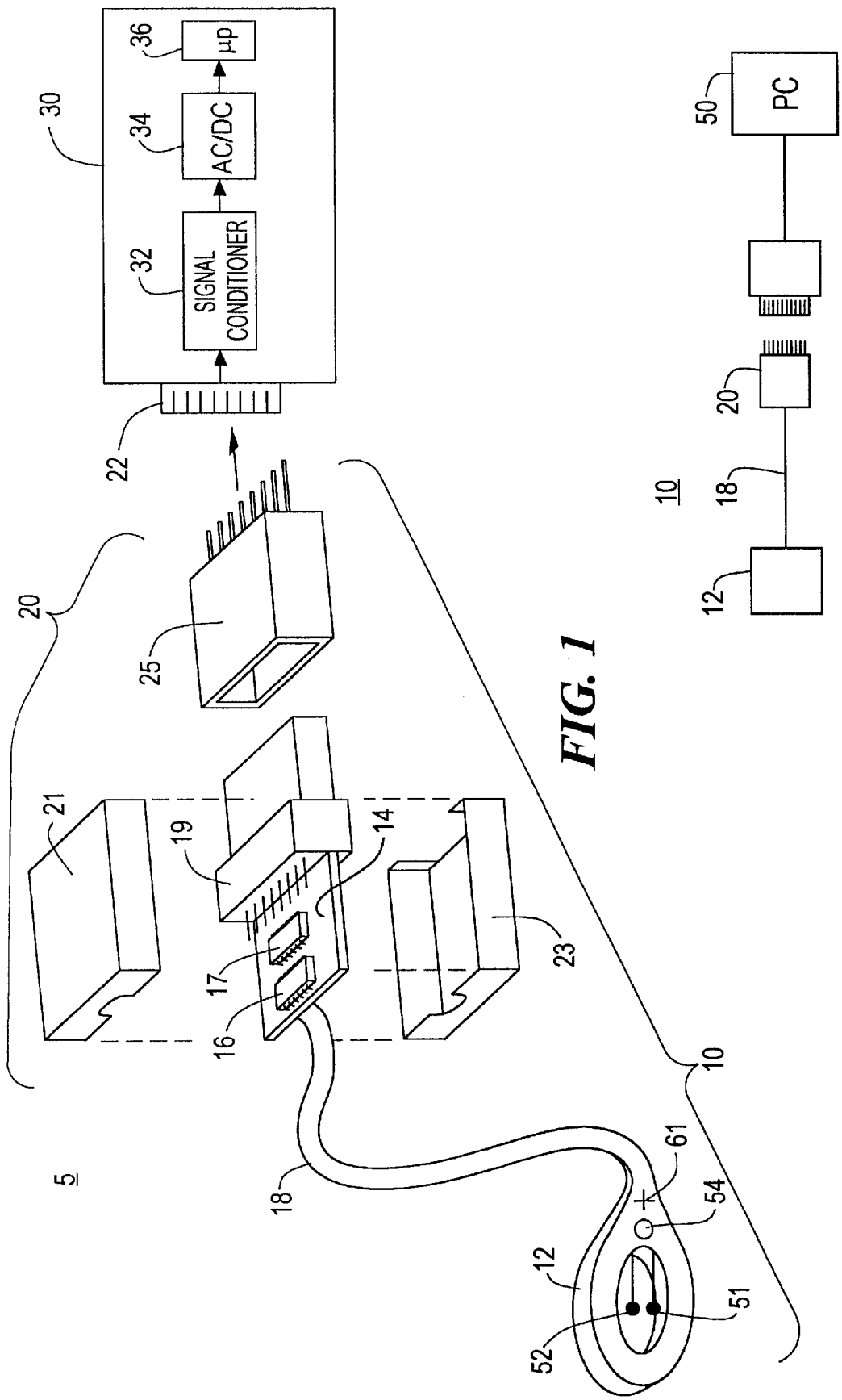

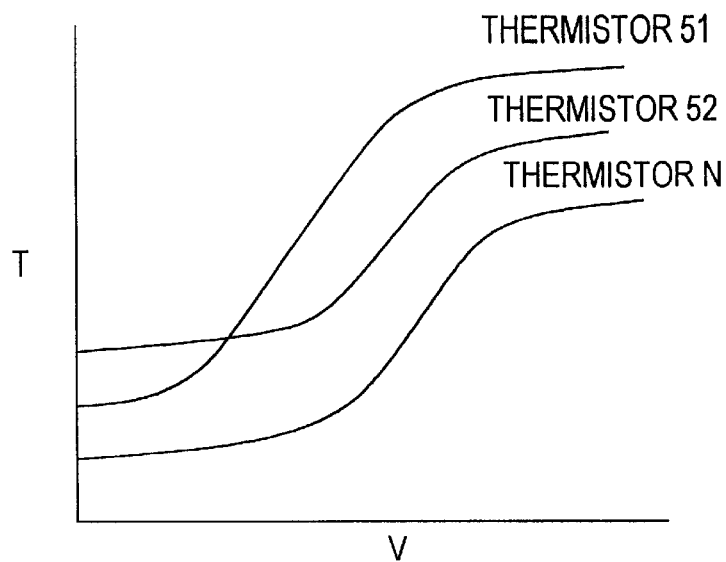
FIG. 3
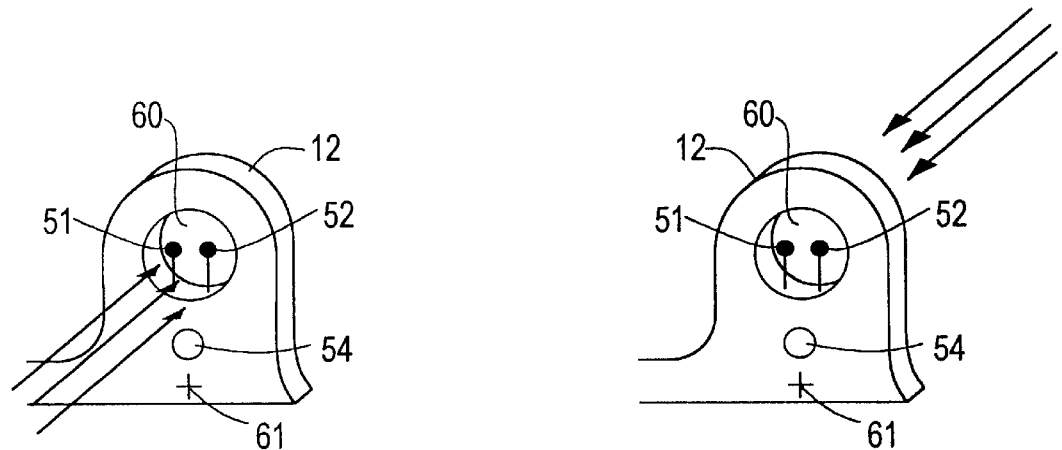
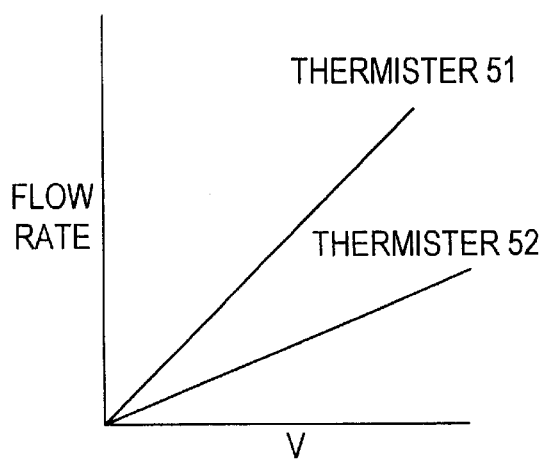
FIG. 4A
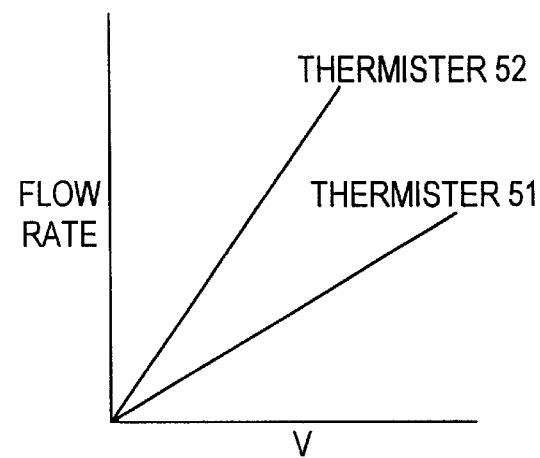
FIG. 4B

FLOW RATE AND DIRECTION MEASUREMENT SYSTEM

RELATED APPLICATION

This application is a continuation-in-part application of Ser. No. 08/572,895, filed Dec. 18, 1995 now U.S. Pat. No. 5,792,951 which is a continuation-in-part application of Ser. No. 08/182,654 filed Jan. 18, 1994, now U.S. Pat. No. 5,511,415.

FIELD OF INVENTION

This invention relates to a measurement system which determines not only the flow rate but also the flow direction.

BACKGROUND OF INVENTION

There are a number of devices which incorporate transducer type probes plugged into a monitor device which processes the signal from the transducer and provides a readout understandable by the user: air flow monitors, ultrasound fetal monitors, EKG monitors, thermal anemometers, fluid flow velocity measurement systems, hygrometry probes, and the like, Such devices generally measure physical parameters such as temperature, fluid flow velocity, and the like.

One problem with these types of devices is that they must be calibrated before use because of manufacturing differences between one transducer and another. For example, a thermistor in one probe may indicate a voltage $V_1$ when subjected to a temperature $T_1$ while another thermistor in another probe may indicate a voltage $V_2$ when subjected to the same temperature $T_1$.

So, the probes are calibrated prior to use. One manufacturer of an air flow measurement system provides the user with a diskette containing all the calibration coefficients for each probe manufactured by serial number. The user connects one or more probes to the monitor, enters the serial numbers and location of those probes, and then a routine automatically calibrates the monitor.

Another older method is to subject the individual probes to known conditions, read the signal provided by the probe, and adjust the monitor until it displays the "correct" reading. See U.S. Pat. No. 4,537,068, column 13, line 64 through column 14, line 6. Some devices even come with their own calibration equipment. See, for example, the "calibrator" described in conjunction with the fluid (blood) flow velocity measuring device described in U.S. Pat. No. 3,595,079.

The problem with these prior art methods is that the individual probes must be calibrated before they are used and, although trained engineers may be able to accomplish this task fairly accurately, technicians and other users may fail to calibrate the device or fail to calibrate the device correctly. Worse, in units with many probes and/or interchangeable probes, the disadvantage lies in the time involved in calibrating the unit each time a probe is added, removed, or replaced. For example, in the case of the air flow measurement system described above, each time a new probe is used, or probes are interchanged or moved, the calibration diskette must be loaded and the calibration routine run again. In the case of the blood flow velocity measuring device of U.S. Pat. No. 3,595,079, the "calibrator" must be used by trained personnel to calibrate the device each time a new probe is used on a new patient by a physician.

Moreover, in addition to the flow rate, there are a number of implementations where it is desirable to know the flow direction. For example, in clean rooms, systems must be used to make sure there is a positive air flow out of each clean room. For hospital isolation rooms, there is a need to ensure that there is a positive air flow into the isolation room. Unfortunately, most prior art air flow measurement systems fail to provide the user with an indication relating to the direction of air flow.

SUMMARY OF INVENTION

It is therefore an object of this invention to provide a flow rate and direction measurement system with fully interchangeable probes.

It is a further object of this invention to provide such a flow rate and direction measurement which does not need to be calibrated by the user before use.

It is a further object of this invention to provide such a flow rate and direction measurement system which is efficient to use.

It is a further object of this invention to provide such a flow rate and direction measurement system in which calibration routines and procedures need not be completed before use or when probes are added, removed or interchanged.

It is a further object of this invention to provide such a flow rate and direction measurement system which does not require any specialized training before use.

It is a further object of this invention to provide such a flow rate and direction measurement system which does not require a separate calibration device.

It is a further object of this invention to provide such a flow rate and direction measurement system which features fully interchangeable probes.

It is a further object of this invention to provide such a flow rate and direction measurement system which determines not only the flow rate but also the flow direction.

This invention results from the realization that the labor intensive task of calibrating probes each time they are removed, replaced, or interchanged can be eliminated by storing the calibration data unique to each probe with each probe and then using the probe monitor to poll each probe for its calibration data to calibrate the probe signal during use of the probe so that probes cans be added, removed, interchanged, and disposed of without having to recalibrate the monitor. The result is self calibrating, fully interchangeable probes each of which has the information required to calibrate the probe during use. This invention results from the further realization that the flow direction can be determined by using two thermistors per probe and by comparing the thermistor signals to determine which is greater or lesser.

This invention features a flow rate measurement and direction system. There are a plurality of self calibrating probes including a sensor with two thermistors. Each thermistor provides a signal related to the flow rate. A connector interfaces the sensor with a monitor. The connector includes means for storing calibration data unique to each of the thermistors. There are also means for interconnecting the sensor with the connector. The monitor includes means for polling the means for storing and for extracting the calibration data, and means for converting the signals provided by the thermistors into calibrated signals. The means for converting includes means for applying the extracted calibration data to the signals. The monitor further includes means, responsive to the calibrated signals, for determining the flow direction.

The means for storing may include a stored array of calibration constants unique to each thermistor. The means for converting includes means for solving an equation wherein the calibrated signals are a function of the calibration constants and each thermistor's signal. Alternatively, the means for storing includes a stored look-up table interrelating flow rate values with thermistor signal values and the means for converting including means for extracting a flow rate value related to the thermistor signal values provided by the sensor. The means for determining the flow direction preferably includes means for comparing the calibrated signals of the two thermistors to determine which is larger.

This invention also features a unique self calibrating flow rate and flow direction measuring probe. There is a sensor including at least two thermistors aligned one in front of the other for providing signals relating to a flow rate and flow direction to be measured; a connector for interfacing the sensor with a monitor; means for interconnecting the sensor with the connector; and means for storing calibration data unique to each thermistor located on the probe. The means for storing typically includes memory means having calibration constants unique to each thermistor stored therein. Alternatively, the means for storing includes memory means having a look-up table relating thermistor's signal value with flow rate values to be measured by the sensor.

This invention also features a flow rate and direction measurement system comprising: a probe having a sensor including at least first and second flow rate measurement devices for providing first and second flow rate signals; means for calibrating each flow rate signal; and means for comparing the flow rate signals to determine the flow direction. The means for calibrating each flow rate signal typically includes a memory device having calibration data stored therein for each flow rate measurement device. Further included are processing means, responsive to the memory device, for applying the calibration data to the first and second flow rate signals to calculate calibrated first and second flow rate signals. Further included may be means for determining which of the calibrated first and second flow rate signals is larger.

A flow rate and direction measurement system in accordance with this invention may include a first flow rate measurement device for providing a first flow rate signal; a second flow rate measurement device for providing a second flow rate signal; and means for comparing the flow rate signals to determine the flow direction.

DISCLOSURE OF PREFERRED EMBODIMENT

Other objects, features and advantages will occur to those skilled in the art from the following description of a preferred embodiment and the accompanying drawings, in which:

FIG. 1 is a schematic partially exploded view of the flow rate and flow direction measurement system of this invention;

FIG. 2 is a schematic view depicting the apparatus according to this invention used to program the individual probes with their unique calibration data;

FIG. 3 is a chart showing the different calibration curves for three different probes;

FIGS. 4A and 4B are charts depicting the different flow rate characteristics of the thermistors used in this invention to determine the flow direction;

Figure 5:
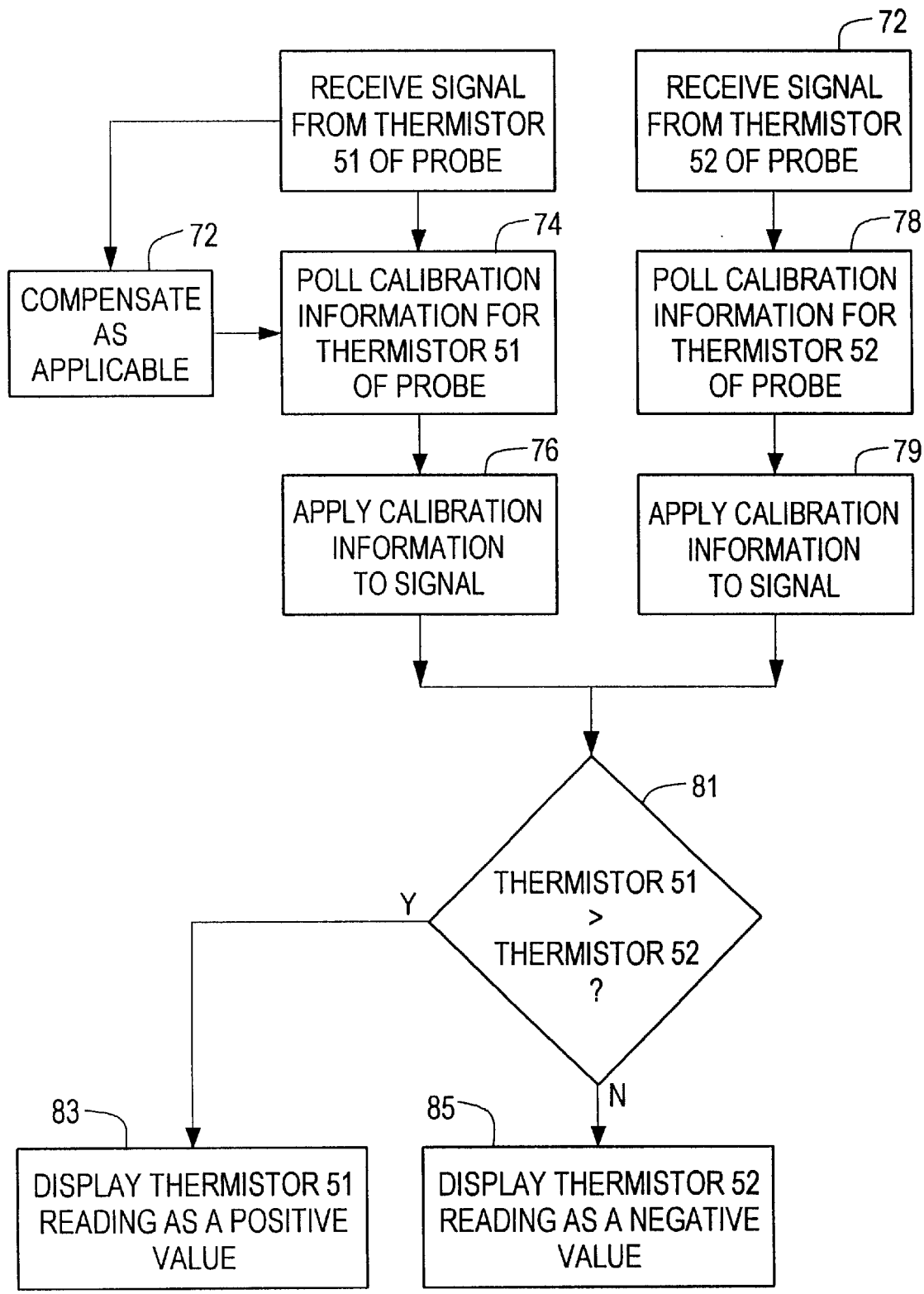
FIG. 5 is a flow chart depicting the operation of the operating system in the monitor of the physical parameter measurement system shown in FIG. 1.

Flow rate and direction measurement system 5, FIG. 1 comprises one or more probes 10 each having one or more sensors 12 including thermistors 51 and 52 and temperature sensor 54. Sensor 12 is approximately 0.5 inches long as measured from left to right in FIG. 1, 0.2 inches wide as measured from top to bottom in FIG. 1, and approximately 0.03 inches thick as measured into the paper in FIG. 1. This small configuration allows probe 10, FIG. 1 to be inserted into the cabinet of an electronic system and between circuit boards and electronic components if required.

Sensor 12 is connected to connector 20 by cable 18. To provide easy access to locations between electronic circuit boards and components, cable 18, FIG. 1, may be a flat Teflon cable running as much as six feet or more in length and having a width of approximately 0.25 inch and the thickness of approximately 0.1 inch thereby allowing probe 10 to be installed easily, quickly, without special handling, drilling, or adjustment of the equipment being monitored. Connector 20 is plugged into monitor 30 at receptacle 22. Connector 20 includes circuit board 14 for storing calibration data unique to sensor 12. For example, circuit board 14 may include memory device 16 and memory device 17 which includes the calibration constants unique to sensor 12 or, alternatively, a look-up table relating various transducer signal values to the corresponding physical parameters measured by the transducer. Connector 20 may be a 10 pin connector plug available from Hirose Electric, part no. 3240-10P-c. Connector 20 includes connector body 19, upper 21 and lower 23 housing members, and socket 25 (Hirose part no. 3260-1053).

Monitor 30 includes means, such as microprocessor 36 for converting the signals provided by thermistors 51 and 52 into calibrated signals. In this way, the calibration data unique to probe 10 is stored right with probe 10 rendering it interchangeable with respect to monitor 30 and with respect to other similar type monitors and probes thereby eliminating the need for the user to calibrate probe 10 each time it is used.

Before distribution, probe 10 is manufactured to include memory devices 16 and 17 which may be Microchip Technology Models No. 93C46 potted on circuit board 14 of connector 20. Probe 10 is connected to computer 50, FIG. 2 and subjected to known conditions. Thermistor 51 would indicate a voltage level V, FIG. 3, when subject to a 20 given temperature T as shown. Note that thermistor 52 may not respond the same as thermistor 51 or any other thermistor (thermistor n) as depicted by the T/V chart in FIG. 3, hence the need for calibration. The calibration data unique to each thermistor is transmitted by computer 50, FIG. 2 to be stored in memories 14 and 16, FIG. 1, of connector 20 associated with probe 10. Accordingly, the calibration data for thermistor 51 is stored in memory 16 and the calibration data for thermistor 52 is stored in memory 17. Alternatively, a single memory device may be used with two specific address locations, one for the calibration data for thermistor 51 and one for the calibration data for thermistor 52.

Then, in use, thermistor 51 and 52 each deliver a particular voltage level through connector 20 and receptacle 22 of monitor 30 to be conditioned by signal conditioner 32 and converted to a d.c. voltage by converter 34. The resulting signals are analyzed by microprocessor 36 which, in addition, polls memory devices 14 and 16 in connector 20 of probe 10 to obtain the calibration data for each thermistor. Microprocessor 36 then applies the calibration data to the signals provided each thermistor to calibrate the signals.

The calibration data stored on memory devices 16 and 17 can be in the form of calibration constants unique to each thermistor. For example, if thermistor 52 provides a voltage V and temperature sensor 54 provides a temperature signal T, the calibration constants stored in memory 17 for thermistor 52 would be $K_0$, $K_1$, and $K_2$, so that microprocessor 36 is programmed to solve the equation:

$$\text{Flow rate}_{thermistor52} = (V^2 - K_0 - K_2 * T)/K_1)^2$$

The flow rate for thermistor 51 would be calculated in a like fashion based on its calibration constants stored in memory 16.

In another embodiment, the memory devices or device includes a stored look-up table which relates thermistor signal values to the parameter being measured by the thermistor. In this embodiment, microprocessor 36 notes the thermistor signal values, polls the look-up table for the physical parameter value related to each thermistor signal value, and outputs the appropriate physical parameter value. In accordance with the previous example, memories 16 and 17 would contain a table of flow rate values related to V and T values and microprocessor 36 is programmed to find and output the appropriate flow rate value related to the particular values of V and T transmitted by probe 10.

To determine the flow direction, the calibrated flow rate signal from each thermistor is calculated as indicated above and compared to determine which is larger. Thermistor 51 is aligned with and located in front of thermistor 52 in orifice 60 of sensor 12, FIGS. 4A and 4B. Thus, when the flow direction is in the direction shown in FIG. 4A, thermistor 51 will detect a higher flow rate than thermistor 52. When, however, the flow direction is in the opposite direction as shown in FIG. 4B, thermistor 52 will detect a higher flow rate than thermistor 51. Microprocessor 36, FIG. 1, is then programmed to compare the signal values from each thermistor, pick the larger value, and output that value along with an indication of the flow direction.

For example, sensor 12, FIGS. 4A and 4B can have an indication such as the "plus" sign shown at 61 so that a flow in the direction shown in FIG. 4A is a positive flow while flow in the direction shown in FIG. 4B is a negative flow. Thus, oppisite side of sensor 12 (not shown) may have a negative (−) sign. Microprocessor 36, FIG. 1, is then programmed to output a positive value when the flow is in the direction shown in FIG. 4A and a negative value when the flow is in the direction shown in FIG. 4B.

The operation of the computer program operating on microprocessor 36, FIG. 1 is depicted in FIG. 5. Monitor 30, FIG. 1, receives a signal from any probe attached to it compensated as applicable, step 72, FIG. 5. Microprocessor 36, FIG. 1, then polls memory 16 of probe 10 for its unique calibration data, step 74, FIG. 5, for thermistor 51 and applies the calibration information to the thermistor signal, step 76. For the signal transmitted by thermistor 52, step 77, the microprocessor polls memory 17, FIG. 1 for its unique calibration data, step 78, FIG. 5. In accordance with equation (1) above, the calibration constants are then applied to the signal, step 79.

If the thermistor 51 reading is greater than the thermistor 52 reading, step 81, the thermistor 51 reading is displayed as a positive value, step 83 indicating a flow in the direction shown in FIG. 4A. If, on the other hand, the thermistor 52 reading is greater than the thermistor 51 reading, the thermistor 52 reading is displayed, step 85, as a negative value indicating a flow in the direction shown in FIG. 4B. Accordingly, a record can be kept not only of the flow rate but also of the flow direction which is important in applications such as clean rooms and isolation rooms in hospitals.

Figure 6:
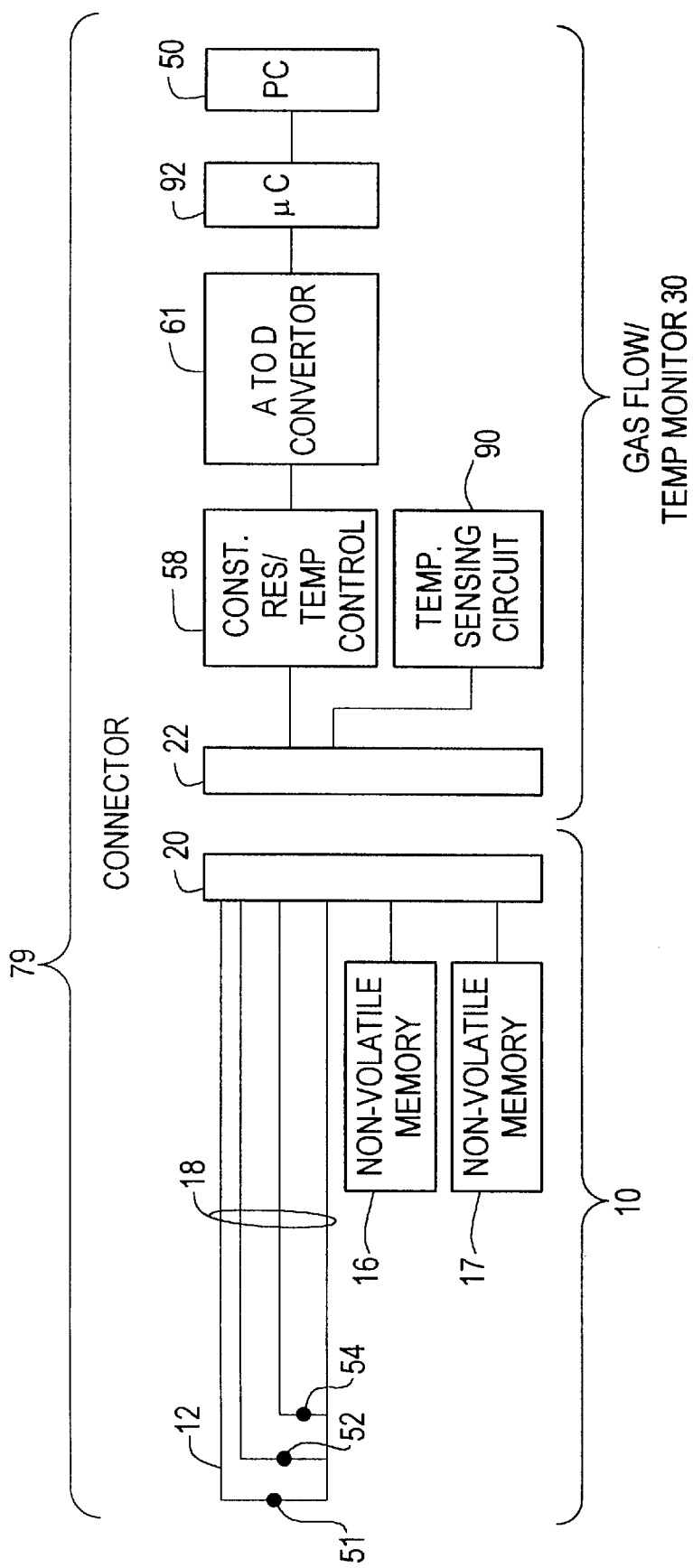
FIG. 6 is a schematic view of one embodiment the physical parameter measurement system shown in FIG. 1 for a gas flow and temperature monitoring system.

One application of the subject invention is gas (e.g. air) flow and temperature sensing system 79, FIG. 6 used to monitor and study or characterize the air flow at different locations.

Probe 10, FIG. 6, is interconnected with gas flow and temperature monitor 30 and the output of gas flow and temperature monitor 30 may be connected to a conventional computer 50 such an IBM PC. Sensor 12 includes three transducers: thermistors 51 and 52 for sensing the cooling rate, and temperature sensor 54 for sensing the temperature of the air or other gas proximate sensor 12. The temperature signal sensed by sensor 54 is delivered over cable 18 to temperature sensing circuit 90 of monitor 30. The cooling rate signals from thermistors 51 and 52 are delivered to a constant resistance/temperature servo control circuit 58 which provides a signal to voltage-to-current converter 61 that is in turn delivered to processor 92. Stored in non-volatile memories 16 and 17 in connector 20 is the air flow calibration data for each thermistor as discussed above. The calibration data is obtained by initially subjecting probe 10 to different known air flows and measuring the cooling rate voltage V and gas temperature T three times, and then using three simultaneous equations of the form shown of equation (1) above for each thermistor. By solving those equations for different known air flows, velocities and temperatures, the three calibration constants $K_0$, $K_1$, $K_2$ can be determined for each particular thermistor. Then, in operation, with $K_0$, $K_1$, and $K_2$ known for this particular probe and stored in memories 16 and 17 on the probe, the temperature T being obtained from temperature sensor 54 and the cooling rate voltage V being obtained from thermistors 51 and 52, the actual air flow rate can be calculated by gas flow and temperature monitor circuit 30.

Figure 7:
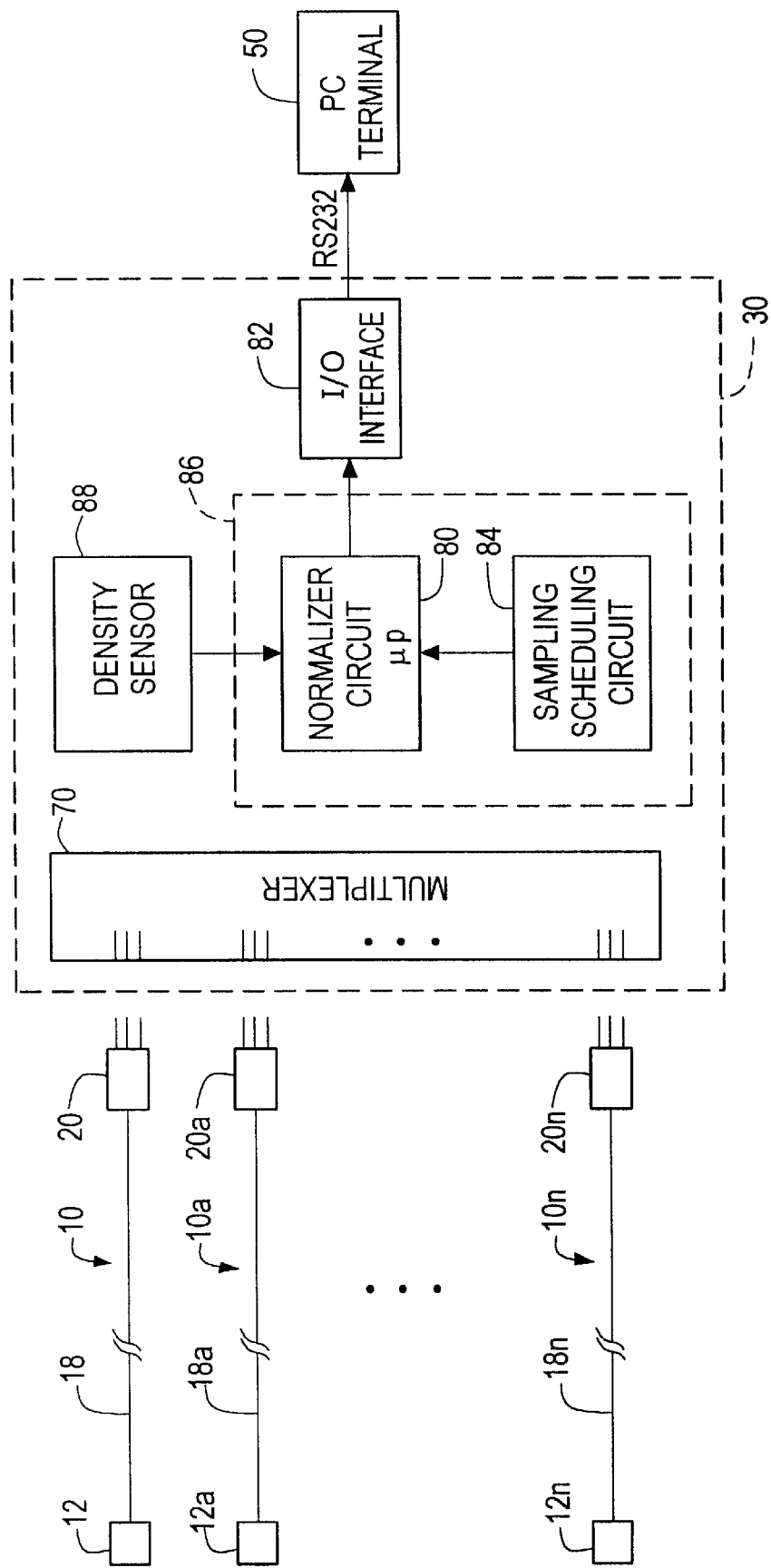
FIG. 7 is a schematic block diagram of a gas flow and temperature monitoring system in accordance with this invention with multiple interchangeable probes.

A multipoint air flow and temperature monitoring system according to this invention is shown in FIG. 7. Gas flow and temperature monitor 30 includes multiplexer 70 which has connected to it a plurality of probes, 10, 10a, . . . 10$_n$ each including at least two thermistors. Multiplexer 70 provides real time sampling of probes 10, 10a, . . . 10$_n$. Normalizer circuit 80, which may utilize a conventional microprocessor, carries out the calculation for air flow set forth in equation (1) above utilizing the calibration data stored in the connectors 20, 20$_a$, . . . 20$_n$ of each probe and the temperature signals and cooling rate signals delivered by sensors 12, 12a, . . . and 12$_n$. This output is provided through I/O interface 82 to conventional personal computer 50 which may implement a conventional microprocessor program to carry out the calculation of gas flow in accordance with equation (1) above. Sample scheduling circuit 84 which defines the sampling rate for multiplexer 70, may be implemented in the same microprocessor as normalizer circuit 80 as indicated by dashed lines 86. A density sensor 88 for sensing the density of air or other gas being measured may be used to provide the ambient gas density which is rationed with the gas density of the air or other gas at mean sea level and multiplied times the airflow from equation (1) above to obtain the linear air velocity in accordance with equation (2):

Linear Air Velocity=Air Flow*(Density/measured Density@MSL)

Although specific features of this invention are shown in some drawings and not others, this is for convenience only as each feature may be combined with any or all of the other features in accordance with the invention. For example, the flow direction features may be used in conjunction with a single probe permanently connected to a read out unit.

Other embodiments will occur to those skilled in the art and are within the following claims:

What is claimed is:

1. A flow rate and direction measurement system comprising:

a plurality of self calibrating probes each including:

a sensor including two thermistors each for providing a signal related to the flow rate;

a connector for interfacing said sensor with a monitor, said connector including means for storing calibration data unique to each of said thermistors and, means for interconnecting said sensor with said connector;

the monitor including:

means for polling said means for storing and for extracting said calibration data, means for converting the signals provided by the thermistors into calibrated signals, said means for converting including means for applying said extracted calibration data to said signals, and means, responsive to said calibrated signals, for determining the flow direction.

2. The system of claim 1 in which said means for storing includes a stored array of calibration constants unique to each said thermistor and said means for converting includes means for solving an equation wherein the calibrated signals are a function of the calibration constants and each thermistor signal.

3. The system of claim 1 in which said means for storing includes a stored look-up table interrelating flow rate values with thermistor signal values, said means for converting including means for extracting a flow rate value related to the thermistor signal values provided by the sensor.

4. The system of claim 1 in which said means for determining the flow direction includes means for comparing the calibrated signals of the two thermistors to determine which is larger.

5. A self calibrating flow rate and flow direction measuring probe comprising:

a sensor including at least two thermistors, one in front of the other, for providing signals relating to a flow rate and flow direction to be measured;

a connector for interfacing said sensor with a monitor;

means for interconnecting said sensor with said connector; and means for storing calibration data unique to each said thermistor, said means for storing being located on said probe.

6. The probe of claim 5 in which said means for storing includes memory means having calibration constants unique to each said thermistor stored therein.

7. The probe of claim 5 in which said means for storing includes memory means having a look-up table relating each thermistor signal value with flow rate values to be measured by said sensor.

8. A flow rate and direction measurement system comprising:

a probe having a sensor including at least first and second flow rate measurement devices for providing first and second flow rate signals;

means for calibrating each said flow rate signal; and means for comparing said flow rate signals to determine the flow direction.

9. The flow rate and direction measurement and direction system of claim 8 in which said means for calibrating each said flow rate signal includes a memory device having calibration data stored therein for each said flow rate measurement device.

10. The flow rate and direction measurement system of claim 9 further including processing means, responsive to said memory device, for applying said calibration data to said first and second flow rate signals to calculate calibrated first and second flow rate signals.

11. The flow rate measurement system of claim 10 further including means for determining which of said calibrated first and second flow rate signals is larger.

12. A flow rate and direction measurement system comprising:

a first flow rate measurement device for providing a first flow rate signal;

a second flow rate measurement device for providing a second flow rate signal; and means for comparing said flow rate signals to determine the flow direction.

13. The flow rate and direction measurement system of claim 12 in which each said device is a thermistor.

14. The flow rate and direction measurement system of claim 13 in which one said thermistor is located in front of the other said thermistor.

* * * * *